A. A. ARNOLD.
EDGING MACHINE.
APPLICATION FILED OCT. 10, 1912.
1,197,785.
Patented Sept. 12, 1916.
6 SHEETS—SHEET 1.
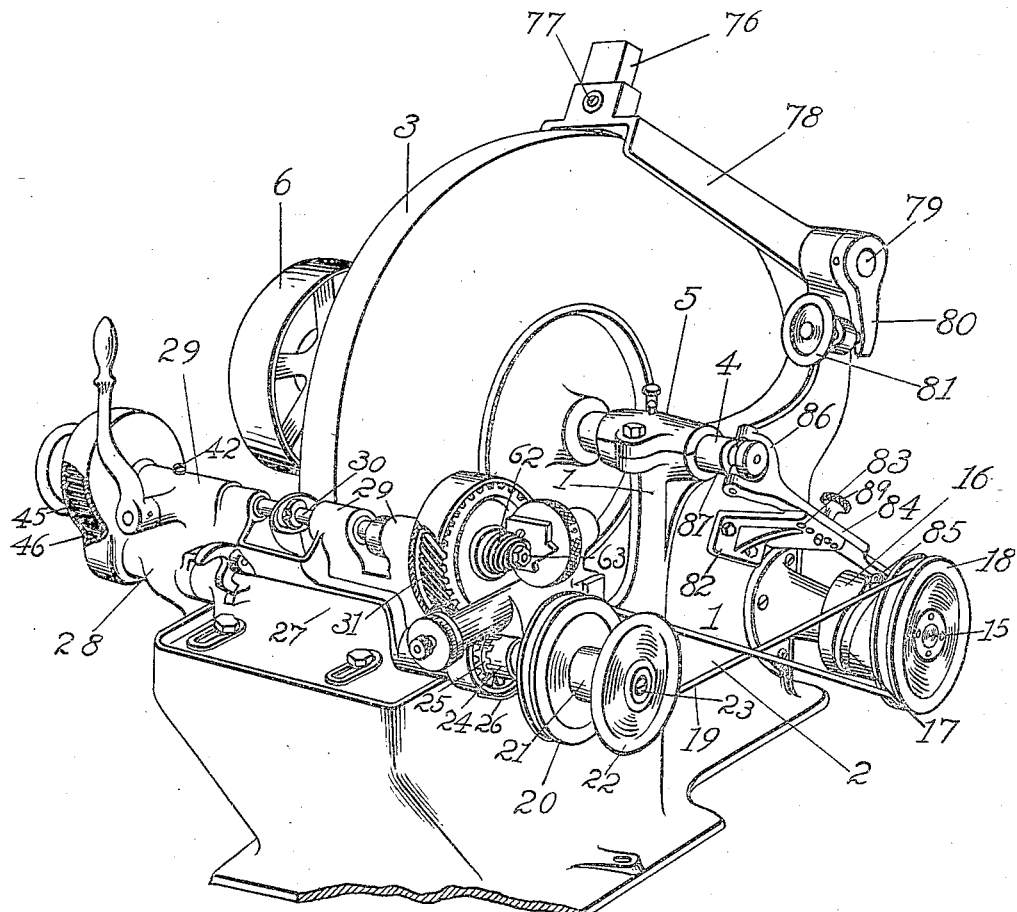
FIG. I
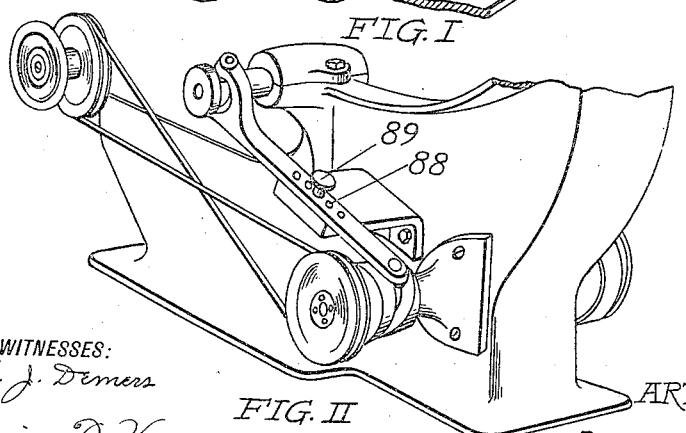
FIG. II
WITNESSES:
Joseph J. Demers
Maurice D. Herman
INVENTOR
ARTHUR A. ARNOLD
By H. H. Stytt & H. H. Parsons
ATTORNEYS

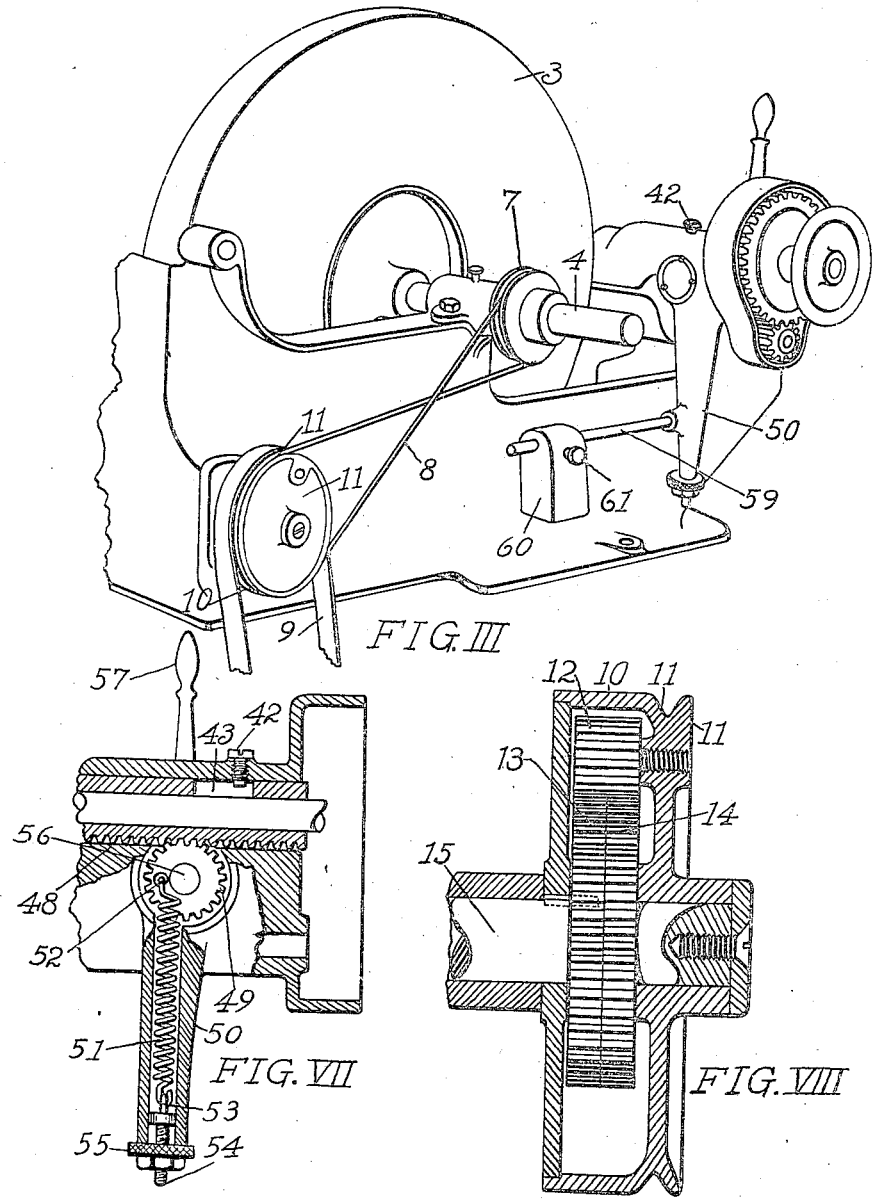

A. A. ARNOLD.
EDGING MACHINE.
APPLICATION FILED OCT. 10, 1912.
1,197,785.
Patented Sept. 12, 1916.
6 SHEETS—SHEET 3.
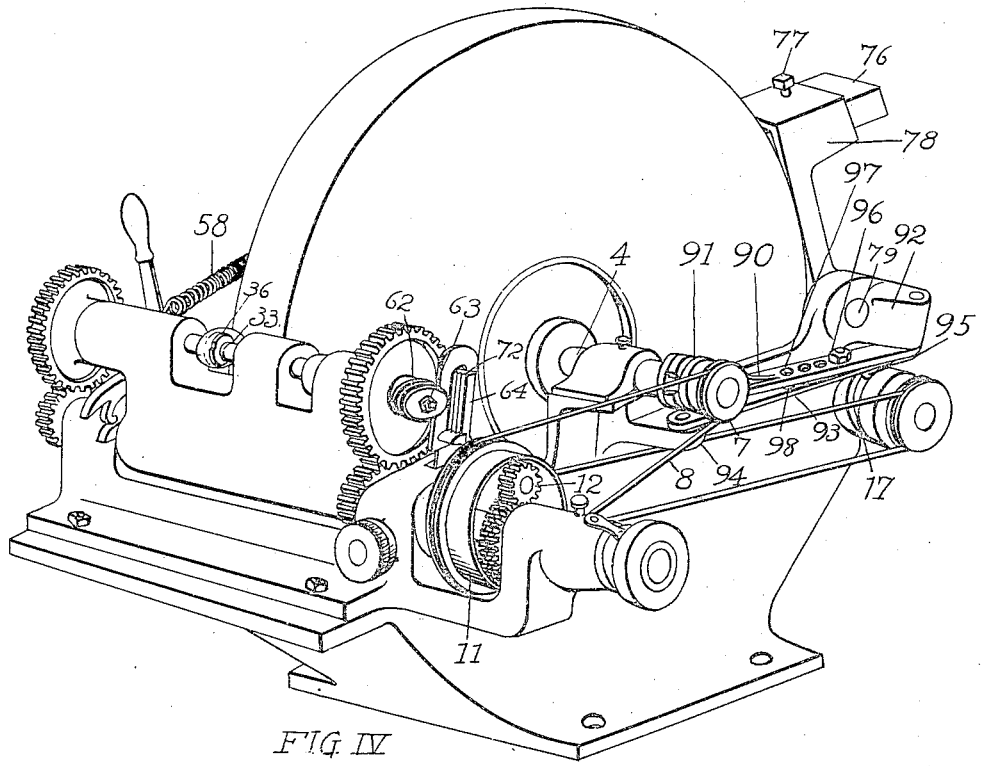
FIG. IV
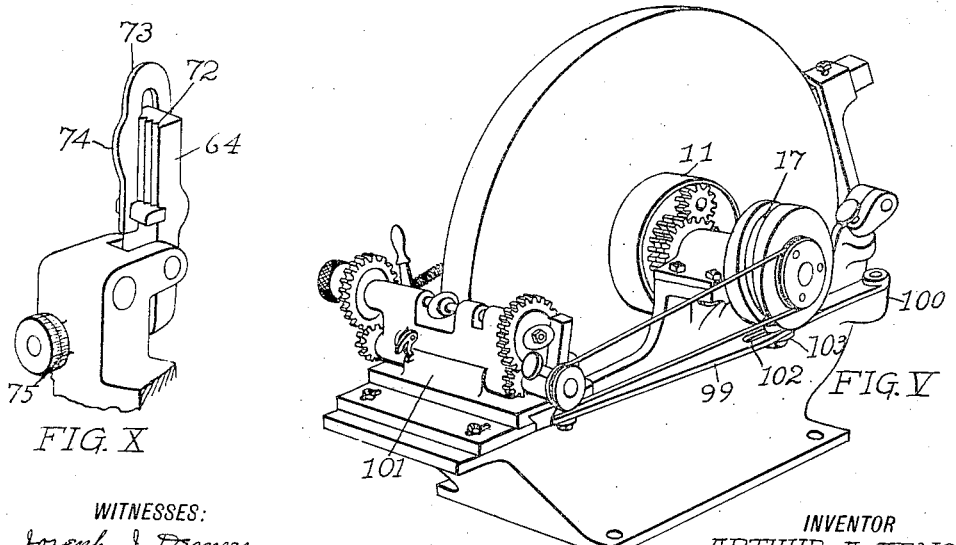
FIG. X
FIG. V
WITNESSES:
Joseph J. Demers
Maurice D. Herman
INVENTOR
ARTHUR A. ARNOLD
By
H. H. Stytt & H. K. Parsons
ATTORNEYS A. A. ARNOLD.
EDGING MACHINE.
APPLICATION FILED OCT. 10, 1912.
1,197,785.
Patented Sept. 12, 1916.
6 SHEETS—SHEET 4.
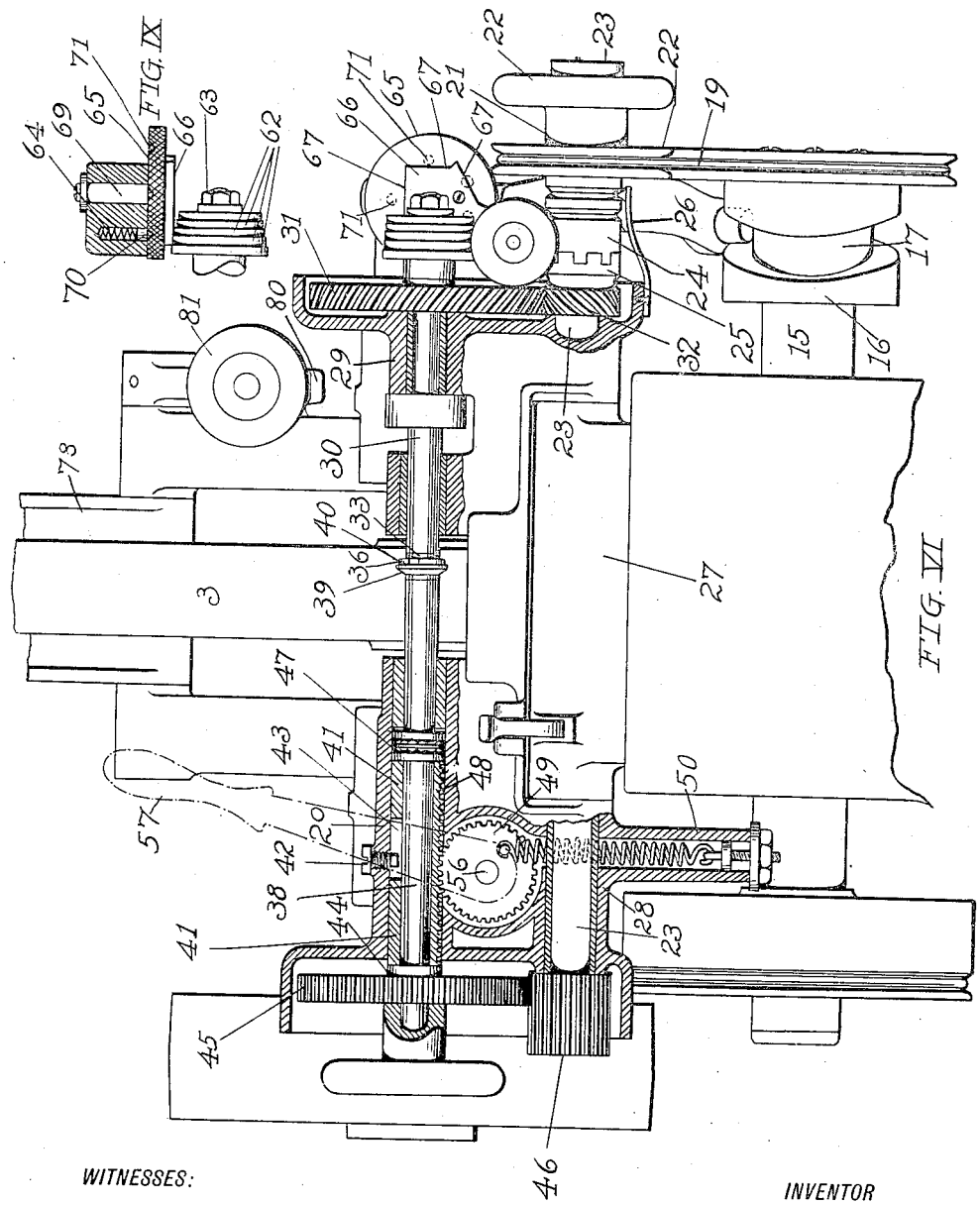
WITNESSES:
Joseph J. Demers
Maurice D. Herman
INVENTOR
ARTHUR A. ARNOLD
By
H. H. Stytt   H. K. Parson.
ATTORNEYS

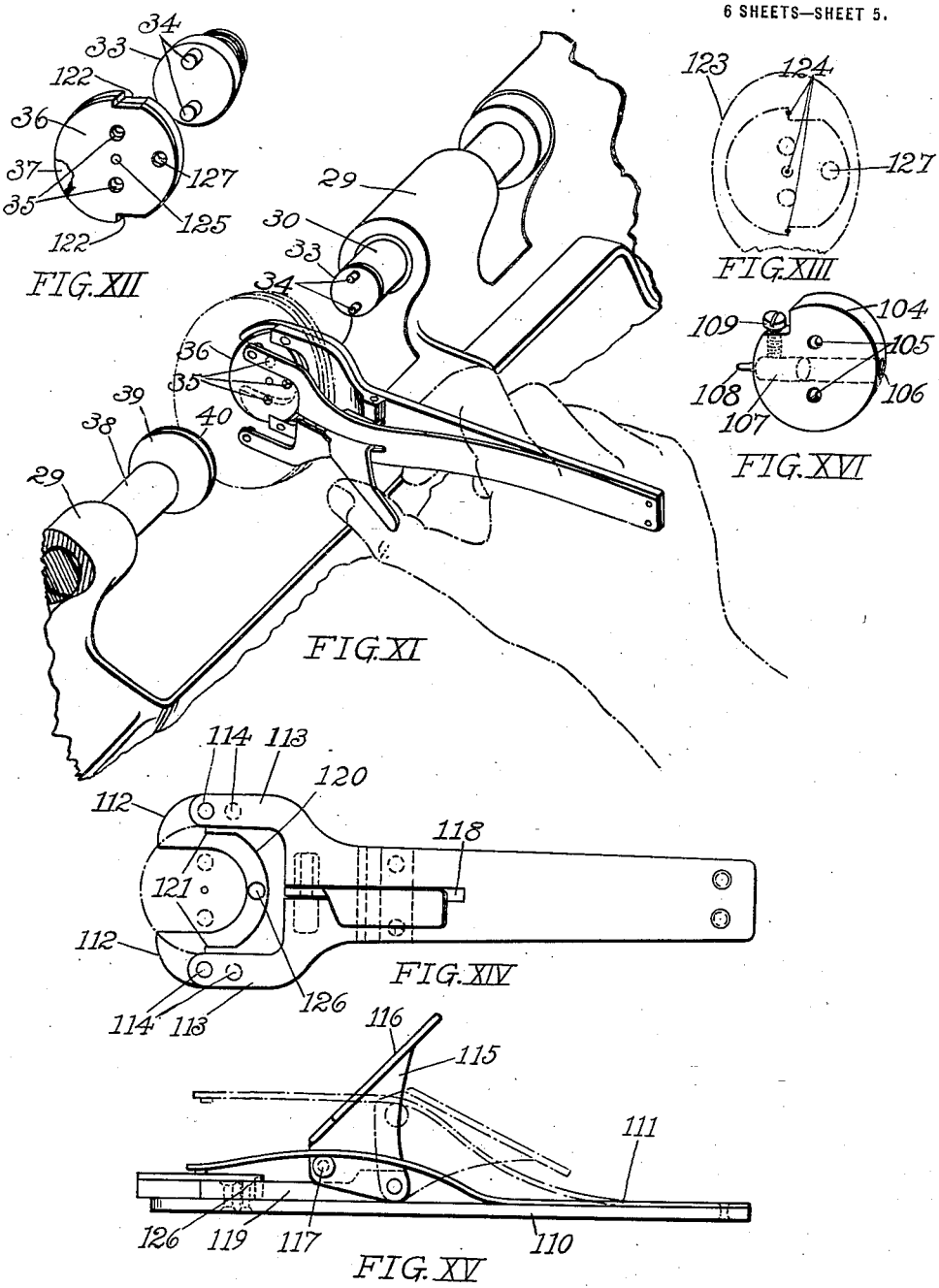

A. A. ARNOLD.
EDGING MACHINE.
APPLICATION FILED OCT. 10, 1912.
1,197,785.
Patented Sept. 12, 1916.
6 SHEETS—SHEET 6.
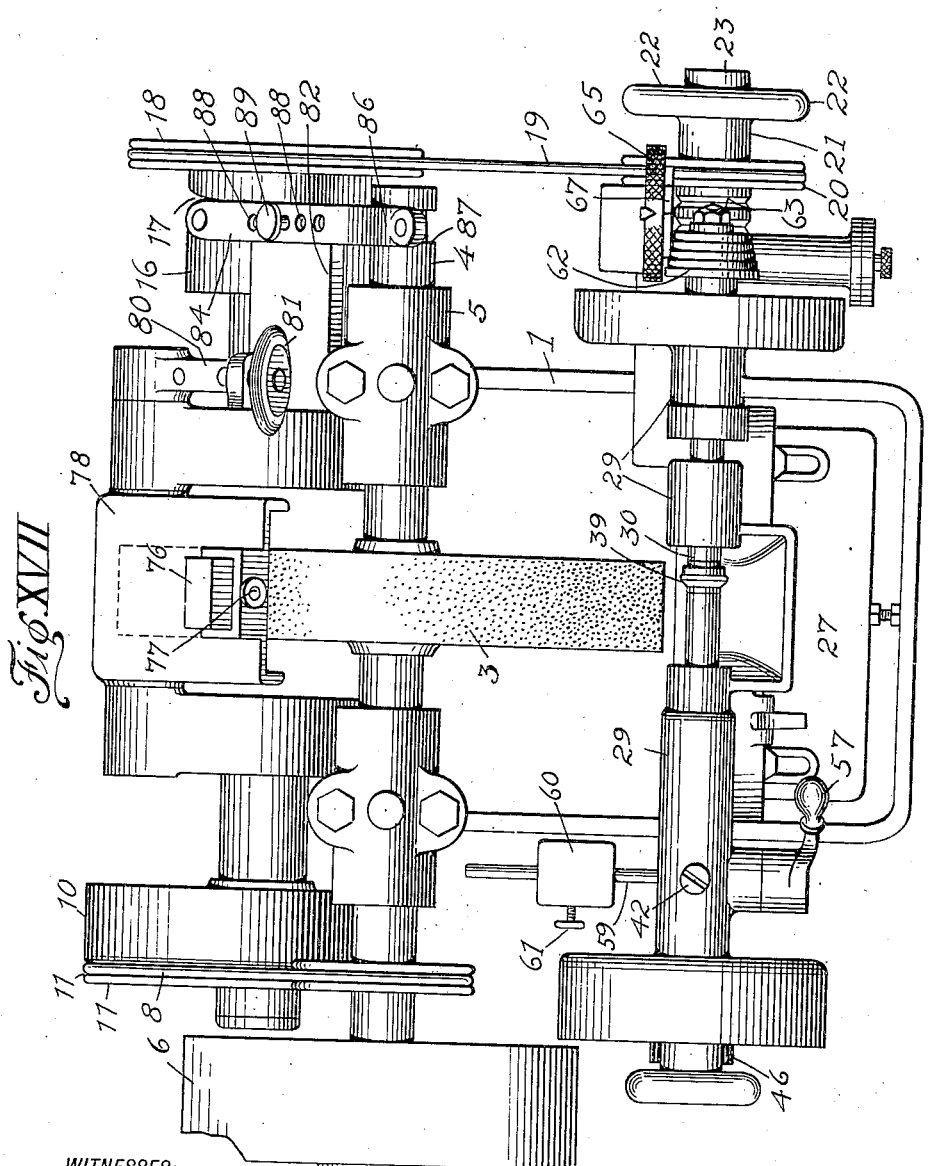
WITNESSES:
Joseph J. Demers
Carroll Bailey
INVENTOR
ARTHUR A. ARNOLD
BY
H. H. Styll, A. K. Parsons
ATTORNEYS

UNITED STATES PATENT OFFICE.

ARTHUR A. ARNOLD, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EDGING-MACHINE.

1,197,785.  Specification of Letters Patent.  Patented Sept. 12, 1916.

Application filed October 10, 1912. Serial No. 724,923.

*To all whom it may concern:*

Be it known that I, ARTHUR A. ARNOLD, a citizen of the United States, residing at Southbridge, in the county of Worcester and State of Massachusetts, have invented certain new and useful Improvements in Edging-Machines, of which the following is a specification.

My invention relates to improvements in lens grinding machines and has particular reference to that type of machines employed in grinding or finishing the edges of lenses preparatory to the mounting thereof.

The leading object of my invention is the provision of a relatively simple, inexpensive, and durable machine of this character which will have few parts to get out of order and which will be so simply constructed throughout that it may easily be operated by persons possessing but slight mechanical skill or knowledge.

A further object of my invention is the provision of a machine which will rotate the lens or lenses being operated upon at a slow but constant rate of speed and with a uniform movement whereby the liability of chipping or uneven grinding of the edges thereof will be eliminated.

Another object of the invention is the provision of an edging machine in which relative lateral movement of the lens holder and grinding tool is attained, whereby there is a more even wear on the tool, and in connection with which means are provided for regulating the amplitude of the said relative movement whereby wear on the entire surface of the tool or on but a small portion thereof may be secured as desired.

Another object of the invention is the provision of a novel form of lens clamp and actuating means therefor in which the pressure of the clamp may be readily adjusted and in which the two coacting parts of the clamp are so constructed as to facilitate correct positioning of a lens therebetween.

The invention has also as its object the provision in conjunction with the peculiarly constructed lens clamps as previously mentioned, of a novel holding device in which the lenses may be placed and which will coact with the lens clamps in securing the desired positioning of the lens.

Among the other important objects of my invention I desire to provide a novel attachment whereby the shape of the lens and also the size of the lens of particular shape desired may be readily varied without the necessity of interchangement of parts, to provide novel and improved means for readily regulating the pressure of the lens or lenses against the tool operating thereon, to provide means for automatically truing the operating tool, to provide novel and improved means for actuating the various parts of the machine, and in general to provide a simple, compact and efficient lens edging machine.

In the accompanying drawings I have illustrated certain embodiments of the generic principles of my invention, but it will be understood that I may make any modifications in the specific details necessary to the attainment of the above stated objects of my invention and falling within the scope of the appended claims without departing from or exceeding the spirit of my invention.

Figure I represents a perspective view of one embodiment of my edging machine looking at the front thereof. Fig. II represents a fragmentary perspective view of the machine looking at the rear and one side thereof. Fig. III represents a perspective view looking at the opposite side of the machine. Fig. IV represents a perspective view of a slight modification of the machine showing a different arrangement of the same parts for attaining the same results. Fig. V represents a perspective view of another modification. Fig. VI represents a vertical longitudinal sectional view through the lens clamp members and adjacent parts. Fig. VII represents an enlarged detail sectional view more particularly illustrating the lens clamp actuating and tension adjusting mechanism. Fig. VIII represents a sectional view through the differential driving gear and housing therefor. Fig. IX represents a plan view with parts in section of the former set and rest for engaging the same. Fig. X represents a perspective view of another construction of adjustable former rest. Fig. XI represents a perspective view illustrating the use of my improved holder for assuring correct positioning of a lens or lenses between the clamp parts of my machine. Fig. XII represents a perspective view of one of the lens clamps and the spindle head for engaging the same. Fig. XIII is a plan view illustrating the method of centering the lens on the lens clamp. Fig. XIV represents a plan view of the holder for inserting the lens between the clamps. Fig. XV represents a side elevation of the holder, the position occupied by the parts when the holder is opened being indicated in dotted lines, and Fig. XVI represents a perspective view of the truing tool for use on my machine. Fig. XVII is a top plan view of the complete machine.

In the drawings, in which similar characters of reference are employed to denote corresponding parts throughout the several views, the numeral 1 designates the main base or supporting portion of my machine having formed integral therewith or secured thereon the trough portion 2 containing fluid for moistening of the grindstone 3 which is rotatably supported by the shaft 4 journaled in bearings 5 rising from the base portion 1.

In most of the forms of my invention I have shown secured on one end of the shaft 4 the driving pulley 6 to receive a belt for driving the stone and in most of the views I have also shown as secured upon the shaft 4 the smaller pulley 7 over which passes the belt 8. In Fig. III, however, it will be observed that instead of the power being transmitted directly to the stone shaft by the main driving belt, said main driving belt 9 passes over the broad sheave or driving pulley portion 10 of the differential gear casing, the belt 8 being engaged in the groove 11 of said casing and transmitting the power from the driving belt 9 to the stone, the differential gearing providing means whereby the stone may be rotated at a relatively greater rate of speed than the lens holding means hereinafter referred to, and whereby maximum power may be imparted to the several operating parts of the machine.

In all of the forms of my invention illustrated I have shown the driven or rotatable casing for the differential gearing which is designated as a whole by the numeral 11, said casing having secured thereto and rotating therewith, while freely independently revoluble, the pinion 12 meshing with the two gears 13 and 14, these gears having a difference of one tooth, whereby upon each rotation of the casing 11 on account of the difference in number of teeth the meshing of the pinion with said gears will relatively turn one of the same with respect to the other one tooth. I preferably suitably secure one of the gears, as for example the gear 13, as shown in Fig. VIII, in fixed position, while the gear 14 is secured on the shaft 15, said shaft consequently rotating at a slow rate of speed relative to the speed of revolution of the driven casing.

In that form of my invention illustrated in Figs. I, II and III the shaft 15 is journaled in the rear portion of the base of the machine extending transversely of the base and having on the opposite end from that on which the differential gearing is disposed the hub 16 having the cam track or groove 17 formed therein, while adjacent said hub is the pulley 18 connected by the belt 19 with the pulley 20. Said pulley 20 is preferably mounted on the sleeeve 21 independently rotatable by means of the hand wheel 22, said sleeve being loosely mounted on the shaft 23 and having a clutch portion 24 for engagement with the clutch member 25 which is secured on the shaft 23. A spring 26 serves to lock the clutch members in engaged or disengaged position, when locked in engaged position the sleeve driven by the belt 19 serving to rotate the shaft 23 therewith. The shaft 23 is rotatably mounted in the bearing 27 rising from the base 1 and projects from the ends of the said bearing. These projecting portions of the shaft 23 serve as pivot bearings for the sleeve portions 28 depending from the lens clamp carriage 29. This carriage 29 comprises a pair of spaced members each having a lens clamp spindle rotatably mounted therein, the two spindles being disposed in axial alinement one with the other. The relation of these parts will best be understood by reference to Fig. VI in which I have shown at the right hand side of the machine the non-sliding rotatable spindle 30 journaled in the carriage 29 and having near its outer end the spiral gear 31 intermeshing with a pinion 32 on the shaft 23, the spindle 30 thus being driven from the shaft 23. Said spindle bears on its inner end the clamp receiving head 33 provided with a pair of pins or dowels 34 adapted to fit into the apertures 35 formed in the clamp head 36 which is provided with a resilient facing 37 for engaging and gripping a lens and preventing slipping of the same without marring thereof.

The left hand side of the carriage 29 has mounted therein my improved rotatable endwise slidable resiliently operated lens clamp spindle 38. This spindle bears on its inner end the lens clamp head 39 provided with the resilient facing 40 and is journaled in the slidable sleeve 41, which is mounted within the carriage 29 but is prevented from rotation by the screw 42 engaged in the slot 43 in the sleeve, this screw thus serving both to limit the inward and outward movement of the sleeve and also preventing rotation thereof. The outward end of the said sleeve 41 bears against the hub 44 of the spur gear 45 which is secured upon the spindle 38 and meshes with the long spur pinion 46 secured on the left hand end of the shaft 23. The length of this pinion is sufficient to permit of sliding of the gear 45 therealong upon movement of the spindle without permitting of the movement of the gear out of mesh with the pinion. In order to resiliently force the spindle 38 inward to clamp a lens between its head 39 and the head 36 of the spindle 30, I mount on the spindle the ball bearing 47, against which bears the inner end of the sleeve 41, while on the underside of the sleeve 41 I form the rack 48 with which meshes the pinion 49 rotatably supported by the carriage at the head of the tubular arm 50 which I have shown as depending from the upper portion of the carriage.

Mounted within the tubular arm 50 is a heavy coil spring 51 having one end eccentrically secured by the pin 52 to the pinion 49 and having its other end fitting into the eye 53 of the bolt 54. A knurled nut 55 engaged on the lower end of the bolt 54 and bearing against the bottom of the arm 50 serves to regulate the tension of the spring, while the pull exerted on the pinion by the spring tends to rotate the pinion and thus to resiliently force the sleeve and, through the contact of the sleeve with the spindle bearing, the spindle inward. I have found this adjustability of the spring and thus of the pressure of the lens clamp of considerable importance since it is frequently desirable to vary the relative pressure exerted when but a single lens is to be held within the clamps from that to be exerted when a plurality of lenses are to be simultaneously held and edged. In order that I may retract the spindle 38 and thus its clamping head 39 when it is desired to remove or insert a lens or for any other purpose, I secure on the shaft 56 of the pinion 49 the handle 57, rocking of the handle operating the pinion to retract the spindle as should be clearly understood by reference to Figs. VI and VII.

I would call particular attention to the method which is employed for operating the two lens clamp spindles simultaneously. This result is attained by employing spur gears at one end of the machine and spiral gears at the other. This arrangement eliminates all possibility of rattling or slipping of the gears and on account of the difference in type of the two gears insures the lens or lenses held by the clamp being uniformly and gradually rotated, while permitting of the lateral movement of the resiliently held spindle when desired.

While in my construction of machine the lenses and their carriage may be forced against the stone by an ordinary coil spring 58 as has been illustrated in certain of the figures of the drawing, I have found that springs are sometimes undesirable and not entirely dependable. I have, therefore, secured to the carriage 29 or to the depending arm 50 the rearwardly extending rod 59 upon which is mounted a weight 60 held in adjusted position by means of the set screw 61. This weight insures forcing of the lenses with an equal pressure at all times for the same adjustment of the weight, while the adjustment of the weight along the rod 59 permits of the securing of any desired pressure of the lens upon the grind stone.

Hitherto it has been the practice upon edging machines to mount on one of the lens clamp spindles a lens form or pattern which will rotate with the spindle and will bear against a fixed or adjustable member carried by the frame, the pattern thus limiting the inward movement of the lens toward the stone and controlling the shape of the lens. With this arrangement it is necessary to have a large variety of forms for the different shapes of lenses and it is also necessary to stop the machine and take off one form and replace with another whenever it is desired to vary the shape of lens being edged.

In my machine I have provided an improved form or pattern set, by the use of which almost any shape of lens may be made and which will be complete in itself and will not necessitate interchangement of parts as is the case with those devices at present in use. This result as is clearly illustrated in the drawings, is attained by mounting on the outer end of the spindle 30 the set of forms 62 which are preferably secured together in a unitary structure and are locked in place by the nut 63.

In that form of the invention best illustrated in Figs. VI and IX I have rising from the frame a support 64, on which is rotatably mounted a disk 65 bearing on its face the irregularly shaped plate 66 having a plurality of straight edges 67 disposed at different distances from the spindle 69 which rotatably supports the disk and plate. These edges are so arranged that by rotation of the disk they will just rest against the edge of one of the forms or patterns 62 so that the adjacent form or pattern will bear upon the plate and be guided thereby. A spring pressed plug 70 engaged in one of the sockets 71 of the disk locks the disk in adjusted position. By this arrangement it is necessary simply to rotate the disk until the desired pattern rests against the plate 66, when the machine will edge the lens according to that pattern.

In Figs. IV and X I have illustrated a slight modification of the above described construction in which I employ the support 64 having grooves 72 formed in the face thereof, into one of which grooves fits the rest 73 which may be formed with a convex portion 74 for engaging one of the patterns, the member 73 being placed in the correct groove to engage the desired pattern and the operation being otherwise the same as described in connection with Figs. VI and IX.

While it will be understood that by this adjustment and employment of different patterns and contact member I may vary the general shape of lens, or, if the patterns are of the same shape but different sizes may vary the size of lens ground, I preferably attain an in and out adjustment of the complete pattern rest by means of the graduated adjustment screw 75, this facilitating the exact regulation of the size of lens to be ground while the shape is controlled by the rotating pattern.

In order to secure most satisfactory operation of an edging machine and to prevent the necessity of too frequent truing of the stone, which is a slow and laborious matter, it has proved necessary to provide some means for relatively shifting the stone and lens or lenses being operated on so that not only the central portion but also both of the edge portions of the grinding surface of the stone will be brought into contact with the lens. I also deemed it advisable in this connection to employ a hone 76 adjustably secured by the thumb screw 77 to the arm 78 pivoted at 79 to the frame and having the depending lug 80 engaged by the adjustable screw 81, which when tightened forces the hone down on the stone to assist in truing the same. To make the lens serve to some extent as an automatic truer of the stone, however, I have in the majority of forms of the invention which are illustrated provided means for laterally shifting the stone, although in Fig. V I have illustrated means for shifting the carriage, the stone being stationary.

In that form of the invention illustrated in Figs. I and II I secure to the side of the base 1 a bracket 82 having a plurality of apertures 83 formed therethrough, while resting upon said bracket is a shift lever 84 having at one end a pin 85 riding in the cam groove 17 of the hub 16 rotating on the shaft 15 and having on its other end the yoke 86 engaging the collar 87 which is mounted to rotate on but prevented from movement longitudinally of the stone shaft 4. This shift lever, as is most clearly shown in Fig. II, has formed therethrough a plurality of apertures 88 corresponding in number and position to the apertures 83 in the bracket 82, while passing downward through a pair of alined apertures 83 and 88 is a pivot pin 89 for pivotally connecting the parts. By shifting of the pin forwardly or rearwardly in the apertures the lateral movement of the stone can be regulated as desired and the same can be caused to vibrate but slightly, or to move a greater distance on each side of center than its own width, as may prove most desirable. This latter extreme movement, of course, is necessary only in the operation of truing; at other times a medium movement dependent on the number of lenses being edged is desired.

In that form of invention shown in Fig. IV the general principle of the stone shift is the same although the details are slightly different, in that the shift lever 90 has one end attached to the shift clamp 91 on the shaft 4 and has the other end pivoted to the extension 92 of the frame. A second lever 93 is pivoted to the lug 94 and has on its other end the pin 95 riding in the cam groove 17, a bolt 96 fitting in alined apertures 97 and 98 formed in the two levers 90 and 93 serving to connect the levers at different pivotal points in the manner of a toggle and the various points of connection serving to vary the throw of the stone, as heretofore described. In Fig. V I have simply shown a single lever 99 pivoted at the rear to the lug 100 on the base and pivoted at its forward end to the sliding base 101 supporting the lens carriage and driving shaft therefor. Said lever has the slot 102 formed therein in which is adjustably secured the pin 103 fitting in the cam groove 17, different adjustments of the pin in the slot of the lever varying the throw of the carriage and thus the relative movement of the carriage and stone. With either of these constructions when I desire to true the stone, I separate the lens clamps and remove from the clamp head 33 the clamp member 36 and substitute therefor the truer head 104 having the pair of apertures 105 formed therein corresponding to the apertures 35 of the clamp head and adapted to receive the pins 34 of the spindle head. Said truer has formed therethrough a socket 106 in which is engaged the handle 107 of the diamond truing point 108, the handle being locked in adjusted position by the set screw 109. The member 104 having been fitted onto the pins 34, it is merely necessary to release the resilient spindle when said spindle will clamp the truer in position, the carriage 29 being then swung toward the stone, operation of the machine will cause the diamond to satisfactorily true up the stone, the stone and diamond being given the greatest possible relative lateral movement in order to insure satisfactory truing of the edges as well as the central portion of the stone.

One of the points which must necessarily be considered in the use of an edging machine is the ease with which a lens may be placed in correct position between the lens clamps. When round eyes are being ground it is, of course, necessary merely to place the center of the lens in axial alinement with the centers of the lens spindles. In the case of the oval lenses, however, which are at present in vogue, these must be very carefully positioned between the clamps, as the matter of the position of the axis thereof is of great importance, particularly in cases of astigmatism, the position of the lens also being of importance in those cases where decentered lenses are employed. It is the common practice at present to place the lenses in position by hand. To obviate the difficulty attendant upon this operation, however, and facilitate the positioning of the lenses with mathematical accuracy I have provided an improved holder for the lenses so constructed as to coöperate with the lens clamp heads and thus insure the exact position of the lens relative to the former or pattern which is secured upon the spindle 30. This clamp, as is clearly illustrated in Figs. XIV and XV comprises a main or stiff base plate 110 having secured to the lower end of the handle portion thereof the resilient metal member 111. The plate 110 is formed with furcations 112 while the spring member is formed with wider spaced narrower furcations 113 which are provided with pads 114 adapted to engage and clamp the lens or lenses to be edged by the machine. To facilitate the ready separation of the plate and spring member, we pivot to the base 110 the plate 115 having the handle portion 116 and provided with the pin or roller 117 which engages the under face of the spring member 111, the plate extending upward through the slot 118 formed in the spring member and the handle resting on the upper face of the holder.

The furcations 112 of the base are just spaced sufficiently to permit the same to fit around the spindle 30 adjacent the lens clamp head 36, while secured upon the plate 110 adjacent the furcations is a filler block 119 having a curved face 120 adapted to fit against the edge of the member 36 and having the parallel inner faces 121 of size to just fit into the notches or recesses 122 formed in the edges of the lens clamp member 36, a pin 126 on the plate 110 fitting into the aperture 127 in the clamp member 36 to facilitate securing of the same in correct position in the holder.

By reference particularly to Fig. XI the use of the tool will be best understood and it will be seen that the lenses 123 are so positioned on the member 36 that the center dot 124 on the lens which is placed to denote the center or intersection of the axes of the lens will just coincide with the aperture 125 in the clamp member 36 while the outer dots 124 are lined up with the alined shoulders of the notches 122 or with the extension thereof formed by the ends of the furcations 112. The clamp member 36 resting on the plate 110 and held in correct position by the filler 119 and the lens being correctly positioned on the clamp member 36, as shown in Fig. XIII, the handle 116 is released to allow the spring member to clamp the lenses and clamp head in place within the holder. The furcations 112 are then placed spanning the spindle head 33 and the entire device turned and moved laterally till the pins 34 enter the apertures 35, when the lens clamp and lenses will be in correct position. The spindle 38 which has necessarily been withdrawn during the placing in position of the lenses is then released to tightly clamp the lenses, the space between the furcations 113 being sufficient to permit of passage of the lens clamp head 39 therebetween. After the lenses are clamped between the two portions of the spindle downward pressure on the handle 116 will disengage the holder from the clamp head and lenses and the holder may be forwardly drawn out of the way.

While in Fig. IV I have shown the differential as mounted on the lens drive spindle and in Fig. V have shown the same as disposed around the grind stone shaft, I wish to call attention to the fact that in these views as well as in the other forms of my invention which I have illustrated, the casing and thus the differential pinion 12 rotates in unison with the grind stone, the power being applied to the grind stone shaft or to the differential casing and from that to the shaft, as indicated in Fig. III, and consequently while the arrangement and appearance of the parts are slightly different in these figures, the operation is the same, in all instances there being connections from the differential to drive the cam for insuring the relative lateral movement of the lens and grinding tool and also being connections from the differential gearing to the lens clamp spindles for driving said spindles and thus rotating the lens relative to the stone.

From the foregoing description taken in connection with the accompanying drawings, the construction and operation of my improved lens edging machine should be readily apparent, and it will be seen that I have provided an efficient and easily operated machine in which power may be supplied either to the stone shaft or the differential pinion, in which the great reduction from driving speed to lens drive speed is satisfactorily attained through the employment of the differential gearing, in which the amount of relative movement of the carriage and stone is readily adjustable and variable as desired, in which the lenses may be readily placed with mathematical accuracy in correct position between the lens holding clamps, in which the shape of the lens may be varied as desired and the machine be at all times complete without the necessity of removal of parts and replacement thereof to vary the shape of the lens, and a machine in which both the pressure of the lens clamp against the lenses and also the pressure of the lenses against the stone may be quickly and satisfactorily varied as required by the particular conditions of operation.

I claim:

1. The combination with a support, of a grinding tool mounted thereon, a differential gearing, driving connections between the stone and the differential, a lens clamp, and connections between the differential gearing and the lens clamp for operating the latter.

2. The combination with a support, of a grinding tool mounted thereon, a lens clamp mounted on the support adjacent the grinding tool, a differential gearing carried by the support, driving connections between the differential gearing and the grinding tool and the differential and the lens clamp, and means operated by the differential gearing for imparting relative lateral movement to the stone with respect to the clamp.

3. The combination with a support of a grinding tool mounted thereon, a lens holder mounted thereon adjacent the grinding tool, a differential gearing carried by the support, connections between the differential gearing and the tool and the differential gearing and the holder for operating the parts in unison, and means for laterally reciprocating one of the parts carried by the support relative to the other parts mounted thereon.

4. A lens grinding machine including an operating tool and a holder for the work to be operated on, a differential gearing connected to said parts to operate the same, and means operated by the differential gearing for causing one of said first named parts to have a lateral reciprocating movement relative to the other of said first named parts.

5. In a lens grinding machine, the combination with a grindstone, of a differential gearing connected thereto to operate in unison therewith, a cam driven by the differential gearing, and connections between said cam and the stone for axially shifting the stone upon operation of the differential gearing.

6. In an edging machine, the combination with a lens holding spindle, of a series of formers mounted thereon, and a rotatably mounted eccentric for engagement with said formers, rotation of the eccentric serving to bring the different portions thereof into engagement with different members of the set of formers to regulate the shape of the edged lens.

7. In a lens grinding machine, the combination with a rotatably mounted grindstone, of a differential gearing connected to operate in unison with said stone, means operated by the differential gearing for axially shifting the stone, and means for regulating the amount of axial displacement of the stone.

8. In a lens grinding machine, the combination with a stone and a differential connected thereto to operate in unison therewith, of a lever operated by the differential for axially reciprocating the stone, and means for varying the movement of the lever to regulate the axial shifting of the stone.

9. In a lens grinding machine, the combination with a rotatable grindstone, of a member mounted for rotation at a determined rate relative to the speed of rotation of the stone, a pivoted lever actuated by said rotatable member for axially shifting the stone, and means for varying the point of pivotance of said lever to regulate the axial movement of the stone.

10. In a lens grinding machine, the combination with a rotatable stone, of a cam mounted to turn at a predetermined rate of speed relative to the speed of the stone, a pivoted lever engaged by the cam and having connection with the stone for axial shifting of the stone, and means for varying the point of pivotance of the lever to vary the movement of the stone caused by the lever.

11. In an edging machine, the combination with a rotatable lens holding spindle, of a set of patterns mounted thereon, a rotatable disk supported adjacent said patterns, and an irregular eccentrically disposed plate mounted on the disk and having a plurality of contact portions, whereby rotation of the disk serves to bring different contact portions of the plate into engagement with different patterns of the set to regulate the shape of the particular lens to be edged, substantially as described.

12. The combination with a grindstone and shaft therefor, of a cam driven at a predetermined rate of speed relative to the speed of rotation of the stone, means operated by the cam for laterally shifting the stone, a work holder, a clutch member connected to the work holder, and a second clutch member driven by the cam and adapted to engage the clutch member of the work holder to rotate the work holder.

13. In a lens grinding machine, the combination with a support, of a shaft journaled therein, a carriage pivotally mounted axially with the shaft, lens clamping spindles rotatably mounted in the carriage, a spur pinion and a spiral pinion secured on the shaft, and spur and spiral gears secured on the spindles and meshing with the respective pinions, whereby the spindles are driven in unison while the difference in type of gears prevents slipping or shaking of the parts.

14. In a machine of the character described, the combination with a driving shaft, of lens clamping spindles mounted adjacent thereto for operating at a determined speed relative to that of the driving shaft, and intermeshing gears and pinions of different types carried respectively by the spindles and the shaft whereby the different types of gears and pinions transmit movement to the spindles at the same rate of speed but oppose each other to prevent any slipping or shaking of the parts.

15. A lens grinding machine, including a support, a carriage pivoted thereto, driven spindles journaled in the carriage in axial alinement with each other, a sleeve surrounding one of said spindles and having a rack formed thereon, and means engaging said rack for retracting the sleeve and inclosed spindle relative to the other spindle of the carriage.

16. In a lens grinding machine, the combination with a work carriage of a rotatable spindle mounted thereon and held against axial movement, a second spindle mounted thereon in axial alinement with the first, a rack disposed parallel to said second spindle and mounted for axial movement in unison therewith, a pinion meshing with the rack, and means for rotating the pinion to regulate the axial adjustment of the spindle.

17. In a lens grinding machine, the combination with a work carriage, of a rotatable spindle mounted thereon and held against axial movement, a second spindle mounted thereon in axial alinement with the first, a rack disposed parallel to said second spindle and mounted for axial movement in unison therewith, a pinion meshing with the rack, and means for manually or automatically rotating the pinion to regulate the axial displacement of the spindle.

18. The combination with a work carriage, of a lens clamp spindle rotatably and slidably supported thereby, a rack connected to the spindle for axial movement therewith, a pinion meshing with the rack, and resilient means for actuating the pinion to force the spindle into operative position.

19. The combination with a work carriage, of a lens clamp spindle rotatably and slidably supported thereby, a rack connected to the spindle for axial movement therewith, a pinion meshing with the rack, a spring for actuating the pinion to force the spindle into operative position, and means for reversely rotating the pinion.

20. In a lens grinding machine of the character described, the combination with a carriage, of a lens clamp spindle slidably and rotatably mounted therein, a rack mounted for sliding movement with the spindle, a pinion meshing with the rack, resilient means for automatically operating the pinion to force the spindle into clamping position, and an adjusting device for regulating the clamping pressure of the spindle.

21. In a machine of the character described, the combination with a clamping member, of a rack mounted for axial movement in conjunction with the clamping member, a pinion meshing with the rack, resilient means connected to the pinion for forcing the clamping member into operative position, means for adjusting the tension of said resilient actuating means to regulate the clamping pressure of the clamping member, and manually operable means for reversely rotating the pinion to withdraw the clamping member from operative position.

22. In a machine of the character described, the combination with a work carriage, of a rotatable non-slidable clamping member carried by the carriage, a rotatable longitudinally slidable clamping member mounted in the carriage in axial alinement with the non-slidable clamping member, a rack mounted for sliding movement with the clamping member, a pinion meshing with the rack, a helical spring eccentrically secured to the pinion for actuating the pinion and thus through the rack the clamping member, means for adjusting the tension of said helical spring, and manually operable means for rotating the pinion to shift the clamping member in either direction as desired.

23. In a machine of the character described, the combination with a swinging work carriage, of a pair of rotatable clamping members carried thereby, a rack and pinion for longitudinally sliding one of said clamping members, a tubular arm depending from the carriage adjacent the pinion, a helical spring mounted in said tubular arm and having one end eccentrically secured to the pinion, and an adjustable member carried by the other end of the spring and engaging the lower end of the arm for adjusting the tension of the spring to regulate the pressure of the clamping member actuated thereby.

24. In a machine of the character described, the combination with a swinging work carriage, of a slidable clamping member carried thereby, a hollow arm depending from the carriage, actuating means for the spindle mounted within the arm, and means carried by the arm for controlling the swinging of the carriage.

25. The combination with a swinging carriage, of a pair of work clamping spindles mounted therein, means for longitudinally shifting one of the spindles, a spindle head secured to one of said spindles and provided with a plurality of projecting pins, and a clamp head having apertures formed therein corresponding in number to said pins and adapted to receive the pins to position the clamp head on the spindle head.

26. The combination with a carriage, of clamp spindles journaled therein, one of said spindles having a pair of pins projecting from one end thereof and having a former secured thereon intermediate the length thereof, and a clamp head having combined sighting and pin receiving apertures formed therethrough, whereby when a lens is placed against the clamp head in position determined by sighting through the apertures of said head and the pins are then engaged in certain of said apertures the lens will be correctly positioned relative to the former on the spindle for satisfactorily edging of the lens at its correct axis.

In testimony whereof I affix my signature in presence of two witnesses.

ARTHUR A. ARNOLD.

Witnesses:
 H. K. PARSONS,
 M. D. HERMAN.